(12) United States Patent
Ng et al.

(10) Patent No.: US 10,361,734 B1
(45) Date of Patent: Jul. 23, 2019

(54) SECOND ORDER INTERFERENCE REJECTION IN A RADIO RECEIVER

(71) Applicant: MOTOROLA SOLUTIONS, INC., Chicago, IL (US)

(72) Inventors: Jiun How Ng, Sunrise, FL (US); Dongho Han, Parkland, FL (US); Moh Lim Sim, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/978,512

(22) Filed: May 14, 2018

(51) Int. Cl.
*H04B 1/16* (2006.01)
*H04B 1/10* (2006.01)
*H04B 1/26* (2006.01)

(52) U.S. Cl.
CPC ............. *H04B 1/1027* (2013.01); *H04B 1/26* (2013.01); *H04B 2001/1045* (2013.01)

(58) Field of Classification Search
CPC ... H04B 1/06; H04B 1/10; H04B 1/16; H04B 1/1027
See application file for complete search history.

(56) References Cited

U.S. PATENT DOCUMENTS

| | | | | |
|---|---|---|---|---|
| 9,548,775 B2 * | 1/2017 | Smith | ..................... | H04B 1/109 |
| 9,998,158 B2 * | 6/2018 | Smith | .................. | H04B 1/1036 |
| 2003/0186664 A1 | 10/2003 | Shah | | |
| 2008/0159453 A1 * | 7/2008 | Smith | ..................... | H04B 1/123 |
| | | | | 375/350 |
| 2009/0068974 A1 * | 3/2009 | Smith | ...................... | H04B 1/30 |
| | | | | 455/304 |
| 2009/0190633 A1 * | 7/2009 | Smith | .................... | H04B 1/123 |
| | | | | 375/148 |

* cited by examiner

Primary Examiner — Blane J Jackson
(74) Attorney, Agent, or Firm — Michael Best & Friedrich LLP (57) ABSTRACT

A device and method for reducing intermodulation within a radio receiver. The device includes an intermodulation filter. The intermodulation filter is configured to receive a signal, apply a first filter and a second filter to the signal to generate a first and a second filtered signal. The intermodulation filter is configured to isolate a first intermodulation component located on a first side of a frequency spectrum of the signal within the second filtered signal, determine an estimated second intermodulation component based on a potential frequency band location, determine a correction factor based on an amplitude and phase relationship between the first and second intermodulation components, apply the correction factor to the estimated second intermodulation component, determine if the second intermodulation component exceeds a predetermined power threshold, and apply the adjusted estimated second intermodulation component to the first filtered signal, suppressing the second intermodulation component.

8 Claims, 6 Drawing Sheets

SECOND ORDER INTERFERENCE REJECTION IN A RADIO RECEIVER

BACKGROUND OF THE INVENTION

Wireless receivers are often implemented in one of several receiver architectures, for example, direct conversion or zero intermediate frequency (ZIF) architecture, dual-conversion architecture, and very low intermediate frequency (VLIF) architecture.

Very low intermediate frequency (VLIF) receivers are popular due to their relatively low cost and small size, as well as their ability to operate over a broad range of frequencies.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A VLIF receiver combines a received radio frequency (RF) signal with a local oscillator prior to analog to digital conversion via a mixer. The local oscillator is set at a frequency close to that of the RF signal, but differing by an offset that is referred to as an intermediate frequency. For example, the intermediate frequency is typically between 3.6 kHz to 5.7 kHz, depending on-channel spacing. The local oscillator thus operates at a frequency either just above or just below the frequency of the RF signal, that is on one "side" of the RF signal. However, due to the non-linear nature of the mixer, interfering spectral components may appear within the baseband close to the center frequency of the receiver. This may result in several complications with the VLIF receiver in processing received radio signals. For example, the receiver may detect a false carrier. This can cause the VLIF receiver to incorrectly change channel, and thus in turn cause a gap in received data. Accordingly, there is a need for an improved VLIF receiver and a method of controlling a VLIF receiver.

Using embodiments presented herein, a radio communications device is able to actively determine and suppress intermodulation components within a received radio signal. One example embodiment provides a radio communication device including a receiver configured to receive radio frequency signals and an intermodulation filter. The intermodulation filter is configured to receive, via the receiver, a radio frequency signal, apply a first filter to the radio frequency signal to generate a first filtered signal, and apply a second filter to the radio frequency signal to generate a second filtered signal. The intermodulation filter is further configured to isolate a first intermodulation component within the second filtered signal, the first intermodulation component located on a first side of a frequency spectrum of the radio frequency signal, determine based on the first intermodulation component, a potential frequency band location of a second intermodulation component within the first filtered signal, the second intermodulation component located on a second side, opposite of the first side, of the frequency spectrum, and determine an estimated second intermodulation component based on the potential frequency band location. The intermodulation filter is further configured to determine a correction factor based on an amplitude and phase relationship between the first intermodulation component and the second intermodulation component, apply the correction factor to the estimated second intermodulation component to generate an adjusted estimated second intermodulation component, determine if the second intermodulation component within the first filtered signal exceeds a predetermined power threshold, and apply, in response to the second intermodulation component exceeding the predetermined power threshold, the adjusted estimated second intermodulation component to the first filtered signal to suppress the second intermodulation component of the first filtered signal.

Another example embodiment provides a method for reducing intermodulation within a radio receiver. The method includes receiving, at a receiver, a radio frequency signal, applying, by an intermodulation filter coupled to the receiver, a first filter to the radio frequency signal to generate a first filtered signal, and applying, by the intermodulation filter, a second filter to the radio frequency signal to generate a second filtered signal. The method further includes isolating, by the intermodulation filter, a first intermodulation component within the second filtered signal, the first intermodulation component located on a first side of a frequency spectrum of the radio frequency signal, determining, by the intermodulation filter, based on the first intermodulation component, a potential frequency band location of a second intermodulation component within the first filtered signal, the second intermodulation component located on a second side, opposite of the first side, of the frequency spectrum, and determining, by the intermodulation filter, an estimated second intermodulation component based on the potential frequency band location. The method further includes determining, by the intermodulation filter, a correction factor based on an amplitude and phase relationship between the first intermodulation component and the second intermodulation component, applying, by the intermodulation filter, the correction factor to the estimated second intermodulation component to generate an adjusted estimated second intermodulation component, and applying, by the intermodulation filter, in response to the second intermodulation component exceeding the predetermined power threshold, the adjusted estimated second intermodulation component to the first filtered signal to suppress the second intermodulation component of the first filtered signal.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that the term "digital signal processor" may refer to single digital signal processor, or to one or more different types of electronic processing devices, as described herein. Accordingly, as can be appreciated by one skilled in the art, the systems and methods described herein are not limited in their application to a digital signal processor, and they may be implemented using various digital and analog components, which for brevity are not described herein and which may be implemented in hardware, software, or a combination of both. For example, some or all of the system and method illustrated in FIGS. 2-6 may be performed/executed via the electronic processor 108 and the memory 110.

Figure 1:
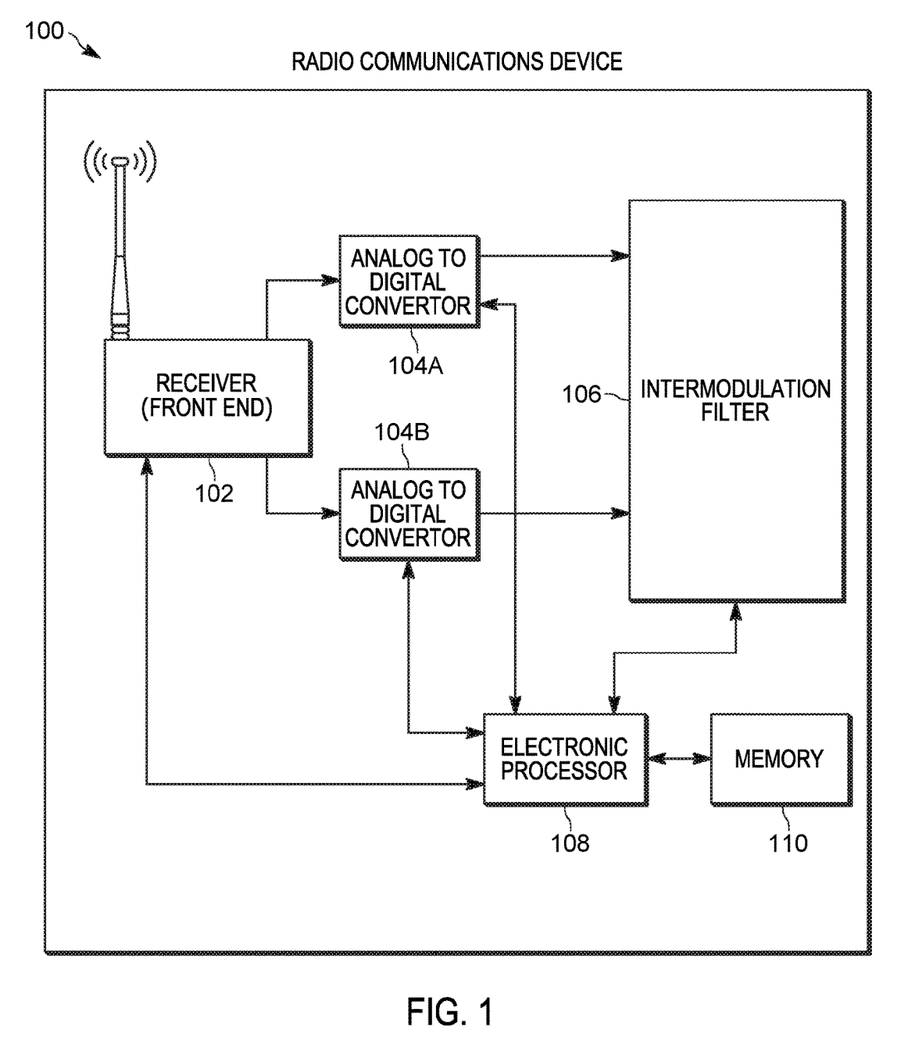
FIG. 1 is a diagram of a radio communications device in accordance with some embodiments.

FIG. 1 is a block diagram of one exemplary embodiment of a communication device 100. In the example shown, the device 100 includes a receiver (specifically, a front end of a receiver) 102, analog to digital converters (ADCs) 104A and 104B, and intermodulation filter 106. The radio communications device 100 may further include an electronic processor 108 and a memory 110. The receiver front end 102 is the front end of a radio receiver composed of various components for the receiving, initial filtering, and initial amplifying of received radio signals before the conversion of the received radio signals from analogue to digital. Such components may include, for example, antennas, bandpass filters, amplifiers, splitters, phase shifters, mixers, local oscillators, and the like (not shown). ADCs 104A and 104B are configured to convert analog radio signals received from the receiver front end 102 to digital radio signals. One ADC 104A, 104B converts an in-phase component I of the radio signal while the other converts the quadrature component Q of the radio signal. The I and Q component signals are then transmitted to the intermodulation filter 106. As explained in more detail below, the intermodulation filter 106 is configured to filter secondary (and, in some embodiments, higher order) intermodulation components within received radio signals. The intermodulation filter may be implemented in software (for example, via the electronic processor 108), hardware, or a combination of both.

The electronic processor 108, the memory 110, the receiver front end 102 as well as other various modules and components, are electrically coupled to each other by or through one or more control or data buses, which enable communication therebetween. The electronic processor 108 operates to control the other components (not shown) of the radio communications device 100. The electronic processor 108 obtains and provides information (for example, from the memory 110 and/or the receiver front end 102), and processes the information by executing one or more software instructions or modules, capable of being stored, for example, in a random access memory ("RAM") area of the memory 110 (for example, during execution) or a read only memory ("ROM") of the memory 110 (for example, on a generally permanent basis) or another non-transitory computer readable medium. The software can include firmware, one or more applications, program data, filters (for example, some or all of the components of the intermodulation filter 106 describe in detail below), rules, one or more program modules, and other executable instructions. The electronic processor 108 retrieves from the memory 110 and may execute, among other things, software related to the control processes and methods described herein. The memory 110 can include one or more non-transitory computer-readable media, and includes a program storage area and a data storage area. The program storage area and the data storage area can include combinations of different types of memory, as described herein. In some embodiments, the electronic processor 108 may include a digital signal processor or be configured to perform digital signal processes.

Figure 2:
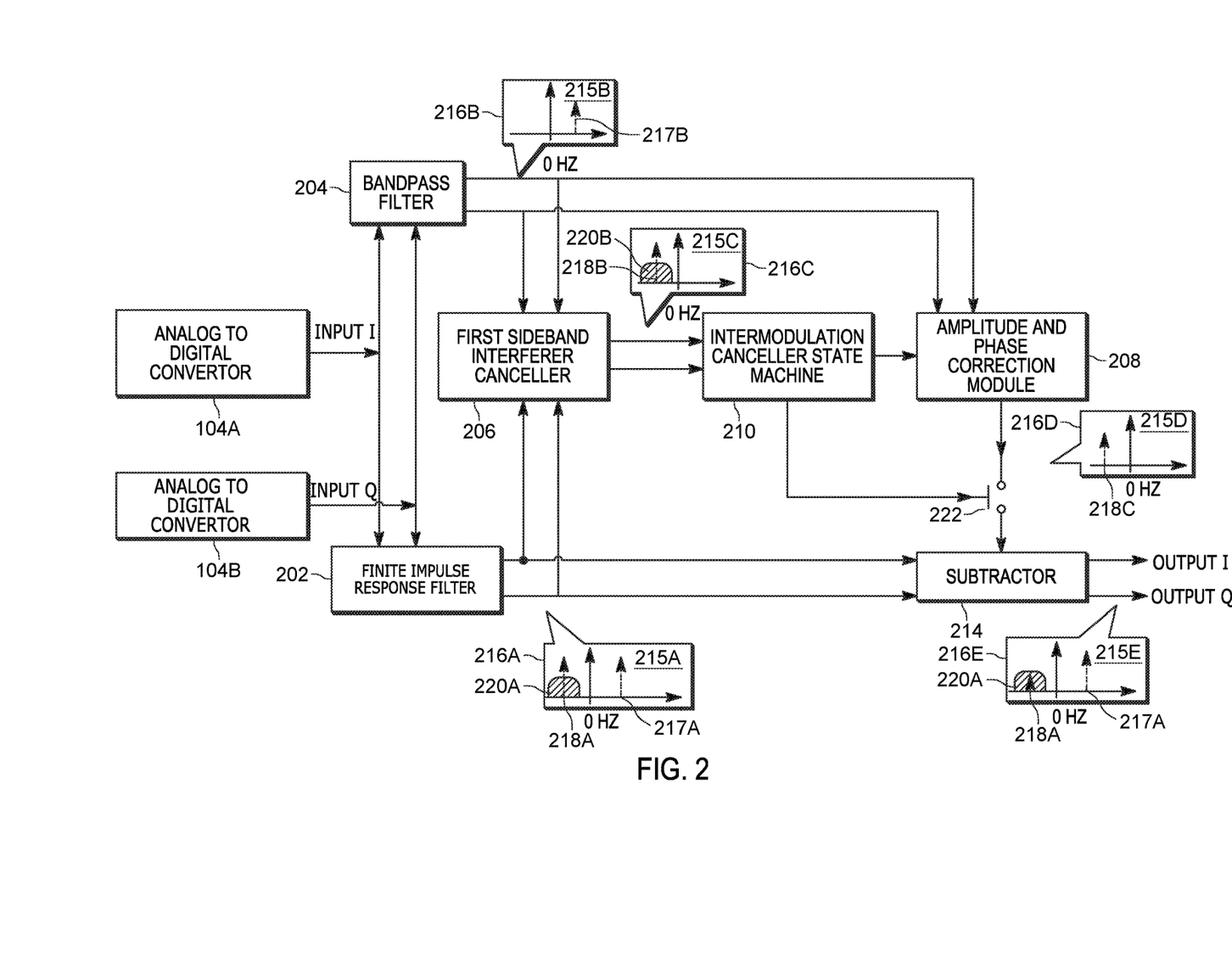
FIG. 2 is a block diagram of an intermodulation filter of the radio communications device of FIG. 1 in accordance with some embodiments.

FIG. 2 is a block diagram illustrating the intermodulation filter 106 within the communication device 100. In the example illustrated, the intermodulation filter 106 includes a finite impulse response filter 202, a bandpass filter 204, a first sideband interferer canceller 206, amplitude and phase correction module 208, an intermodulation canceller state machine 210, and subtractor 214.

Figure 3:
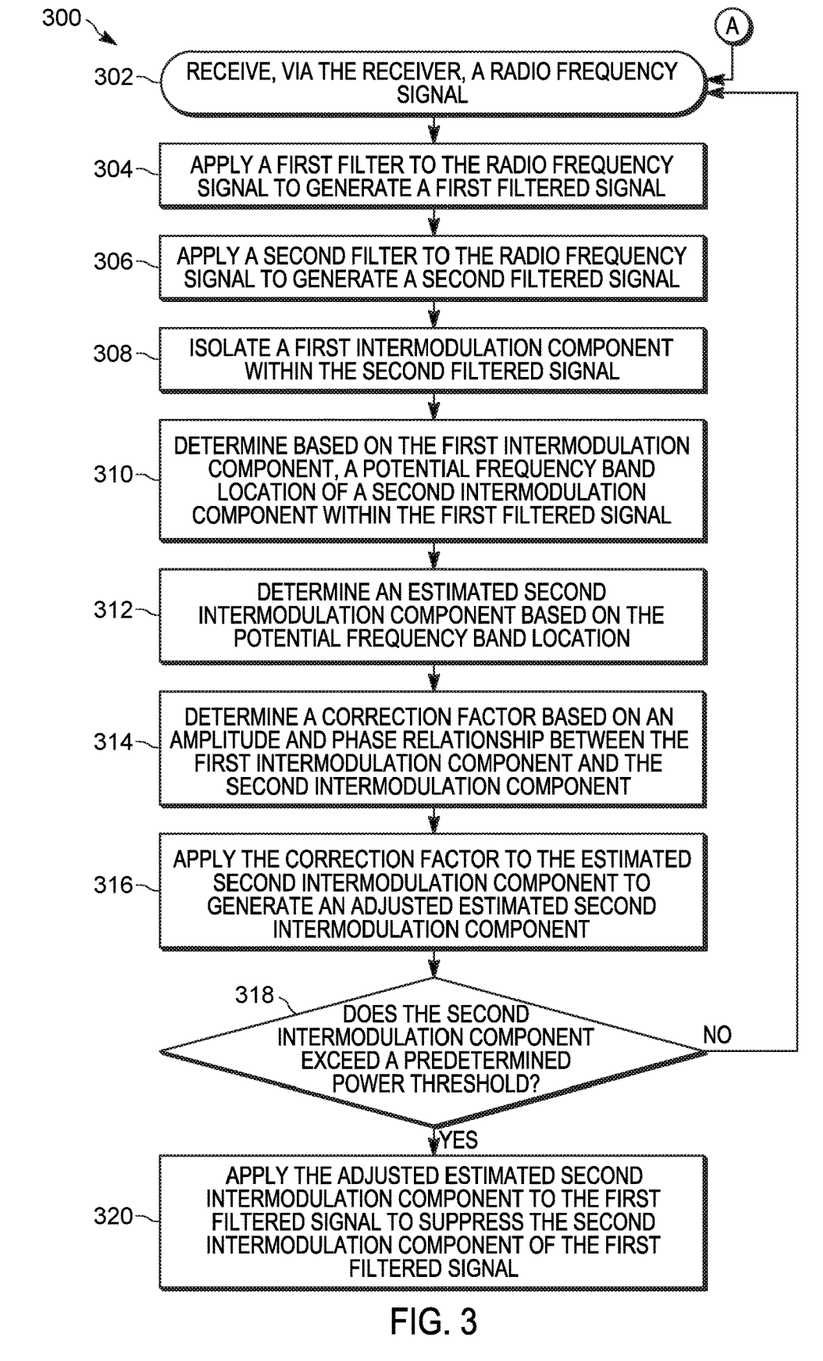
FIG. 3 is a flowchart of a method of reducing radiofrequency interference in the radio communications device of FIG. 1 in accordance with some embodiments.

FIG. 3 illustrates an example method 300 for improving second order interference rejection in a radio receiver. As an example, the method 300 is described in terms of the radio communications device 100, specifically the intermodulation filter 106 and its components illustrated in FIG. 1, as described above.

At block 302, the intermodulation filter 106 receives, via the receiver 102, a radio frequency signal. At block 304, the intermodulation filter 106 applies a first filter to the radio frequency signal to generate a first filtered signal. In the embodiment illustrated in FIG. 2, the first filter is the FIR filter 202. An example of the resulting (simplified) frequency spectrum of the first filtered signal 215A is illustrated in diagram 216A. As illustrated in the diagram 216A, the first filtered signal 215A includes a first intermodulation component 217A, a second intermodulation component 218A, and a designated communication channel 220A of the received radio signal. The second intermodulation component 218A is located within the designated communication channel 220, interfering with the information within the received radio signal. As can be understood by one of skill in the art, a frequency spectrum of an electrical signal (in this case the received radio signal) is the distribution of the amplitudes and phases of each frequency component against frequency. In the illustrated diagrams 215A-D, (assuming that the received radio signal has been down-converted by the ADCs 104A and 104B), the frequency spectrums of the corresponding signal are plotted with respect to the direct current (DC) or 0 Hertz (Hz) axis.

Returning to FIG. 3, at block 306, the intermodulation filter 106 applies a second filter to the radio frequency signal to generate a second filtered signal 215B (shown in diagram 216B). In the embodiment illustrated in FIG. 2, the second filter is the bandpass filter 204. At block 308, the intermodulation filter 106 isolates a first intermodulation component within the second filtered signal, the first intermodulation component located on a first side of a frequency spectrum of the radio frequency signal. An example of the resulting (simplified) frequency spectrum of the second filtered signal 215B is illustrated in diagram 216B. In the embodiment illustrated, the bandpass filter 204 is configured to isolate the first intermodulation component 217B. It should be understood that in some embodiments, the intermodulation filter 106 may further include one or more additional filters configured to isolate the first intermodulation component 217B. It should also be understood that the first intermodulation component 217B may be located on either the upper or lower side of the frequency spectrum of the radio signal.

Returning to FIG. 3, at block 310, the intermodulation filter 106 determines, based on the first intermodulation component 217B, a potential frequency band location of the second intermodulation component 218A (shown in FIG. 2, diagram 215A). As shown in FIG. 2, diagram 216A, the second intermodulation component 218A is located on a second side of the frequency spectrum of the received radio signal, the side opposite of the first intermodulation component 217A. In the embodiment illustrated in FIG. 2, the first sideband interferer canceller 206 is configured to isolate the first side intermodulation component 217A from the signal and determine, based on the frequency of the first intermodulation component 217A, the potential frequency band location 220B of the second intermodulation component 218A.

Returning to FIG. 3, at block 312, the intermodulation filter 106 determines an estimated second intermodulation component 218B (FIG. 2) based on the potential frequency band location 220B. In the illustrated embodiment, the intermodulation canceller state machine 210 is configured to determine the estimated second intermodulation component 218B. At block 314, the intermodulation filter 106 determines a correction factor to apply to the estimated second intermodulation component 218B. The correction factor is determined based on the amplitude and phase relationship between the first intermodulation component 217A and the second intermodulation component 218A on the opposite side of the frequency spectrum of the radio frequency signal. In the embodiment illustrated in FIG. 2, the amplitude and phase correction module 208 determines the correction factor based on the second filtered signal 215B from the bandpass filter 204. In some embodiments, the correction factor is predetermined based on a stored frequency value of an intermodulation component. The stored frequency value may be based on a default intermodulation component frequency (for example, an initial seed value) or based on previously determined second intermodulation components.

Returning to FIG. 3, at block 316, the intermodulation filter 106 applies the correction factor to the estimated second intermodulation component 218B to generate an adjusted estimated second intermodulation component 218C. An example of the frequency spectrum of the resulting signal is shown in diagram 215D. As shown in the diagram 215D, the adjusted estimated second intermodulation component 218C has been isolated from the potential frequency band location 220B by the amplitude and phase correction module 208.

Returning to FIG. 3, at block 318, the intermodulation filter 106 determines if the second intermodulation component 218A exceeds a predetermined power threshold. In other words, the intermodulation filter 106 determines if the intermodulation component present within the radio signal and/or if the second intermodulation component 218A is severe enough that additional filtering to suppress the second intermodulation component 218A (provided via the method 300) is necessary. As explained in further detail below in regard to FIGS. 4-6, the second intermodulation component may be determined (or detected) in multiple ways.

When the intermodulation filter 106 determines that the second intermodulation component 218A exceeds the predetermined power threshold, the intermodulation filter 106 applies the adjusted estimated second intermodulation component 218C (shown in FIG. 2, diagram 216D) to the first filtered signal to suppress the second intermodulation component 218A within the first filtered signal. In some embodiments, applying the adjusted estimated second intermodulation component to the first filtered signal suppresses the second intermodulation component within the first filtered signal by approximately 16 dB. As shown in FIG. 2, the adjusted estimated second intermodulation component 218C from the amplitude and phase correction module 208 is applied to the first filtered signal (from the FIR filter 202) via the subtractor 214. In the illustrated embodiment, the application of the adjusted estimated second intermodulation component is controlled via the intermodulation canceller state machine 210 (illustrated by the switch 222). The state machine 210 determines, via one or more methods (for example, methods 400, 500, and 600 described below), when the second intermodulation component 218A is present in the received radio signal and thus when to apply the adjusted estimated second intermodulation component to the received radio signal. A frequency spectrum diagram 216E of the resulting filtered signal 215E is shown in FIG. 2. As illustrated in the diagram 216E, the second intermodulation component 218A has been suppressed so that it no longer overpowers the channel 220A. When the second intermodulation component fails to exceed the predetermined power threshold, the method 300 is repeated again at block 302. Likewise, after the adjusted estimated second intermodulation component is applied to the first filtered signal at block 320, the method 300 starts again at block 302. Although the first intermodulation component 217A is shown as being present in the resulting filtered signal 215E, it should be understood that, in some embodiments, the first intermodulation component 217A may also be suppressed and/or filtered from the signal 215E.

Figure 4:
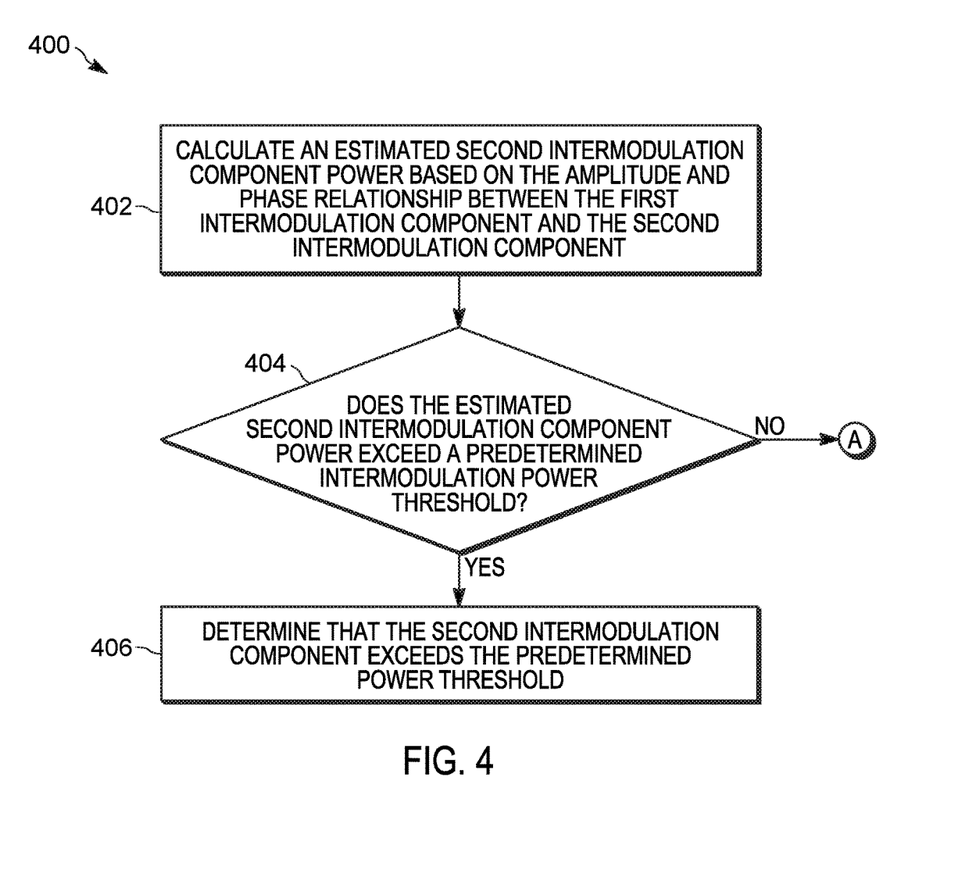
FIG. 4 is a flowchart of a method of determining an intermodulation component in a radio signal received by the radio communications device of FIG. 1 in accordance with some embodiments.

FIG. 4 illustrates an example method 400 for (indirectly) detecting a second intermodulation component in a radio signal received by a radio receiver. As an example, the method 400 is described in terms of the radio communications device 100, specifically the intermodulation filter 106 and its components illustrated in FIGS. 1 and 2 as described above. Some or all of the method 400 may be performed in addition to or as part of the method 300. For example, the method 400 may be performed at block 318 to determine if the second intermodulation component is present and/or affecting the received radio signals.

At block 402, intermodulation filter 106 calculates an estimated second intermodulation component power based on the amplitude and phase relationship between the first intermodulation component and the second intermodulation component. At block 404, the intermodulation filter 106 determines if the estimated second intermodulation component exceeds a predetermined intermodulation power threshold. In other words, the intermodulation filter 106 determines whether the power/amplitude of the estimated second intermodulation component is great enough to affect the received radio signal. When the estimated second intermodulation component power exceeds the predetermined intermodulation power threshold, the intermodulation filter 106 determines that the second intermodulation component exceeds the predetermined power threshold (block 406). When the estimated second intermodulation component power fails to exceed the predetermined intermodulation power threshold, the method 400 is exited and the intermodulation filter 106 returns to A (block 302) of the method 300.

Figure 5:
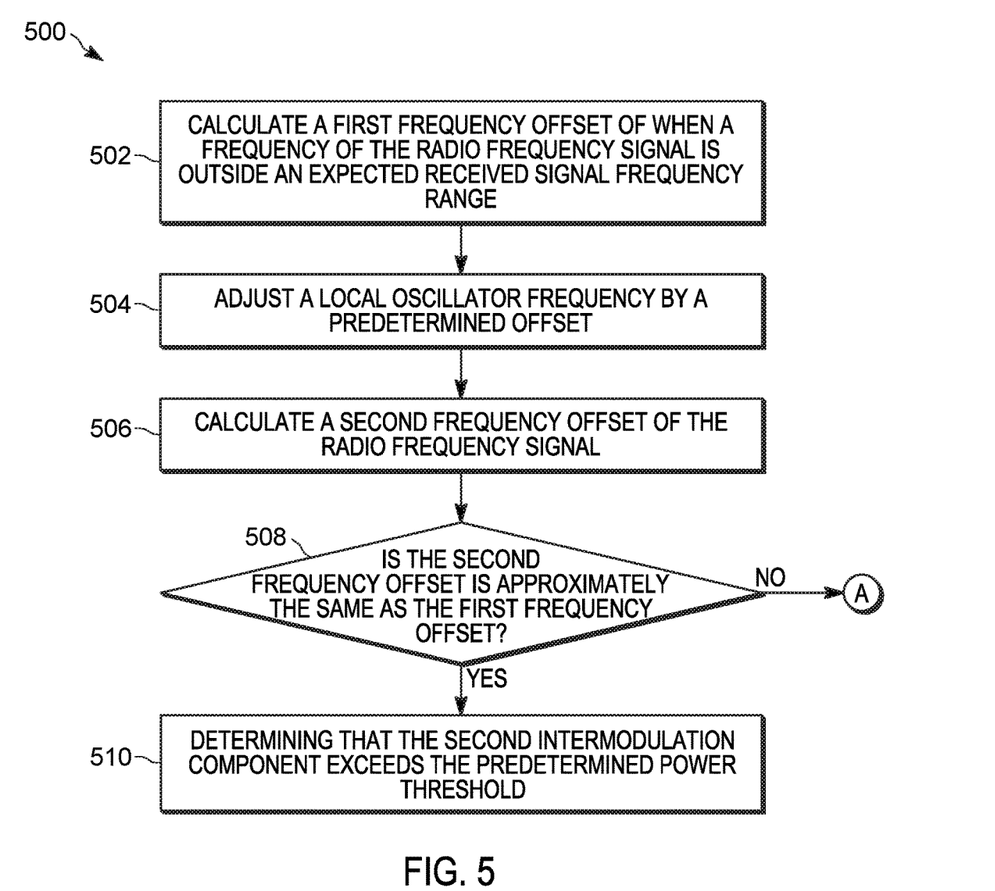
FIG. 5 is a flowchart of a method of determining an intermodulation component in a radio signal received by the radio communications device of FIG. 1 in accordance with some embodiments.

FIG. 5 illustrates an example method 500 for (indirectly) detecting a second intermodulation component in a radio signal received by a radio receiver. As an example, the method 500 is described in terms of the radio communications device 100, specifically the intermodulation filter 106 and its components illustrated in FIG. 2 as described above. Some or all of the method 500 may be performed in addition to or as part of the method 300. For example, the method 500 may be performed at block 318 to determine if the second intermodulation component is present and/or affecting the received radio signals.

When a frequency of the received radio signal is offset, or different, from an expected carrier/center frequency of the radio signal (or outside of an expected carrier/center frequency range), an intermodulation component may be present within the radio signal. To determine that the frequency offset is in fact a product of an intermodulation component, the oscillating frequency of the local oscillator (not shown) within the front end of the receiver 102 may be adjusted by a known offset (block 504). The intermodulation filter 106 then calculates a second frequency offset of the received radio frequency signal (block 506). At block 508, the intermodulation filter 106 determines if the second frequency offset is approximately the same as the first frequency offset. When the second frequency offset is approximately the same as the first frequency offset, (meaning the adjustment of the oscillating frequency did not significantly affect the radio signal) then it is determined that the second intermodulation component exceeds the predetermined power threshold (block 510). When the second frequency offset is different from the first frequency offset (meaning the adjustment of the oscillating frequency affected the radio frequency signal), then it is determined that the second intermodulation component fails to exceed the predetermined power threshold. In either case, the local oscillator is then returned to its original oscillating frequency. When the estimated second intermodulation component power fails to exceed the predetermined intermodulation power threshold, the method 500 is exited and the intermodulation filter 106 returns to A (block 302) of the method 300.

Figure 6:
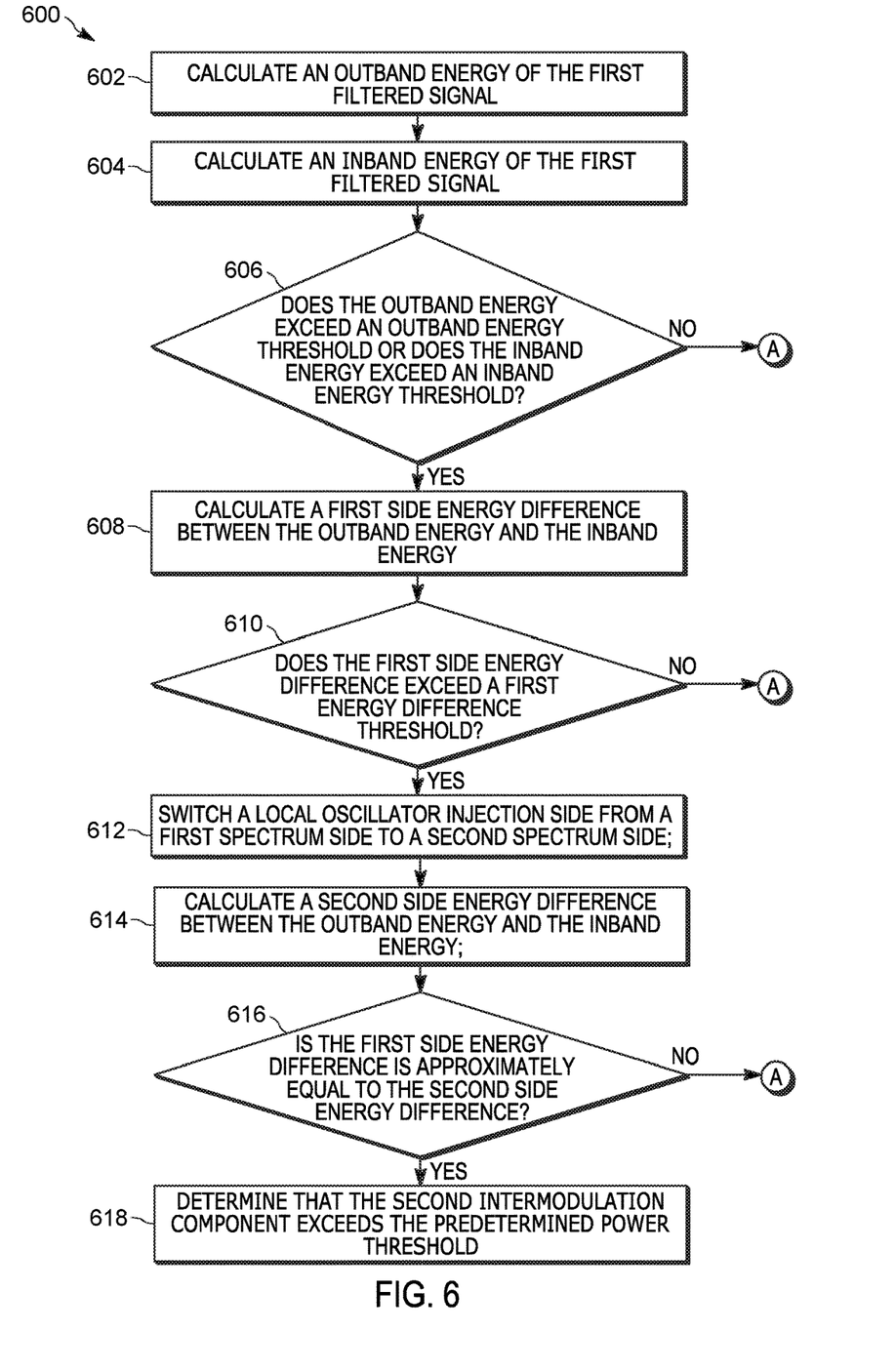
FIG. 6 is a flowchart of a method of determining an intermodulation component in a radio signal received by the radio communications device of FIG. 1 in accordance with some embodiments.

FIG. 6 illustrates an example method 600 for (indirectly) detecting a second intermodulation component in a radio signal received by a radio receiver. As an example, the method 600 is described in terms of the radio communications device 100, specifically the intermodulation filter 106 and its components illustrated in FIG. 2 as described above. Some or all of the method 600 may be performed in addition to or as part of the method 300. For example, the method 600 may be performed at block 318 to determine if the second intermodulation component is present and/or affecting the received radio signals.

At block 602, the intermodulation filter 106 calculates an outband energy of the first filtered signal. The outband energy is the spectral energy of the first filtered signal before resampling and filtering (i.e. before the bandpass filter 204 in FIG. 2). At block 604, the intermodulation filter 106 calculates an inband energy of the first filtered signal. The inband energy is the spectral energy of the first filtered signal after the resampling and intermediate frequency filtering (i.e. after the bandpass filter 204 in FIG. 2).

At block 606, the intermodulation filter 106 determines if the outband energy exceeds an outband energy threshold or if the inband energy exceeds an inband energy threshold. If both the outband energy and the inband energy fail to exceed the corresponding threshold, the method 600 is exited and the intermodulation filter 106 returns to A (block 302) of the method 300. In the case of either exceeding the corresponding threshold, at block 608 the intermodulation filter 106 calculates a first side energy difference between the calculated outband energy and the calculated inband energy and compares, at block 610, the first side energy difference to a first energy difference threshold. When the first side energy difference exceeds the first energy difference threshold, the intermodulation filter 106 switches the injection side of the local oscillator (not shown) from a first (current) spectrum side to a second (opposite) spectrum side (block 612). For example, the first spectrum side may be a low-side (in other words, the local oscillator's frequency is less than the carrier/center frequency) and the second spectrum side may be a high-side (the local oscillator's frequency is greater than the carrier/center frequency). When the first side energy difference fails to exceed the first energy difference threshold, the method 600 is exited and the intermodulation filter 106 returns to A (block 302) of the method 300.

At block 614, the intermodulation filter 106 calculates a second side energy difference between the outband energy and the inband energy. The intermodulation filter 106 then determines, at block 616, if the first side energy difference is approximately equal to the second side energy difference. When the first side energy difference and the second side energy difference is approximately the same, then the intermodulation filter 106 determines that the second intermodulation component within the received radio signal exceeds the predetermined power threshold (block 618). When the first side energy difference is not approximately equal to the second side energy difference, the method 600 is exited and the intermodulation filter 106 returns to A (block 302) of the method 300.

It should be understood that, in some embodiments, the radio communications device 100 utilizes more than one of the methods 400, 500, and 600 described above to determine if the second intermodulation component exceeds the predetermined power threshold. In such embodiments, even when one of the methods fail and returns to A (block 302 of the method 300), the intermodulation filter 106 may implement one or more of the other methods before returning to block 302. Should one or more of the methods determine that the second intermodulation component exceeds the predetermined power threshold, the method 300 continues at block 320.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A radio communication device comprising:
   a receiver configured to receive radio frequency signals;
   an intermodulation filter configured to:
      receive, via the receiver, a radio frequency signal;
      apply a first filter to the radio frequency signal to generate a first filtered signal;
      apply a second filter to the radio frequency signal to generate a second filtered signal;
      isolate a first intermodulation component within the second filtered signal, the first intermodulation component located on a first side of a frequency spectrum of the radio frequency signal;
      determine based on the first intermodulation component, a potential frequency band location of a second intermodulation component within the first filtered signal, the second intermodulation component located on a second side, opposite of the first side, of the frequency spectrum;
      determine an estimated second intermodulation component based on the potential frequency band location;
      determine a correction factor based on an amplitude and phase relationship between the first intermodulation component and the second intermodulation component;
      apply the correction factor to the estimated second intermodulation component to generate an adjusted estimated second intermodulation component;
      determine if the second intermodulation component within the first filtered signal exceeds a predetermined power threshold; and
      apply, in response to the second intermodulation component exceeding the predetermined power threshold, the adjusted estimated second intermodulation component to the first filtered signal to suppress the second intermodulation component of the first filtered signal.

2. The radio communication device of claim 1, wherein the intermodulation filter indirectly determines if the second intermodulation component exceeds the predetermined power threshold by
   calculating an estimated second intermodulation component power based on the amplitude and phase relationship between the first intermodulation component and the second intermodulation component,
   determining if the estimated second intermodulation component power exceeds a predetermined intermodulation power threshold, and
   determining that the second intermodulation component exceeds the predetermined power threshold when the estimated second intermodulation component power exceeds a predetermined intermodulation power threshold.

3. The radio communication device of claim 1, wherein the intermodulation filter indirectly determines if the second intermodulation component exceeds the predetermined power threshold by
   calculating a first frequency offset of the radio frequency signal when a frequency of the radio frequency signal is outside an expected received signal frequency range;
   adjusting a local oscillator frequency by a predetermined offset;

calculating a second frequency offset of the radio frequency signal;

determining if the first frequency offset is approximately the same and the second frequency offset; and determining that the second intermodulation component exceeds the predetermined power threshold when the first frequency offset is approximately the same as the second frequency offset.

4. The radio communication device of claim 1, wherein the intermodulation filter indirectly determines if the second intermodulation component exceeds the predetermined power threshold by calculating an outband energy of the first filtered signal;

calculating an inband energy of the first filtered signal;

determining if the outband energy exceeds an outband energy threshold;

determining if the inband energy exceeds an inband energy threshold;

calculating, when either or both of the following occurs: the inband energy exceeds the inband energy threshold and the outband energy exceeds the outband energy threshold, a first side energy difference between the outband energy and the inband energy;

determining if the first side energy difference exceeds a first energy difference threshold;

switching, in response to the first side energy difference exceeding the first energy difference threshold, a local oscillator injection side from a first spectrum side to a second spectrum side;

calculating, a second side energy difference between the outband energy and the inband energy;

determining if the first side energy difference is approximately equal to the second side energy difference; and determining that the second intermodulation component exceeds the predetermined power threshold when the first side energy difference is approximately equal to the second side energy difference.

5. The radio communication device of claim 1, wherein the correction factor is a known stored value.

6. The radio communication device of claim 1, wherein applying the adjusted estimated second intermodulation component to the first filtered signal suppresses the second intermodulation component of the first filtered signal by approximately more than 16 dB.

7. A method for reducing intermodulation within a radio receiver, the method comprising:

receiving, at the radio receiver, a radio frequency signal;

applying, by an intermodulation filter coupled to the receiver, a first filter to the radio frequency signal to generate a first filtered signal;

applying, by the intermodulation filter, a second filter to the radio frequency signal to generate a second filtered signal;

isolating, by the intermodulation filter, a first intermodulation component within the second filtered signal, the first intermodulation component located on a first side of a frequency spectrum of the radio frequency signal;

determining, by the intermodulation filter, based on the first intermodulation component, a potential frequency band location of a second intermodulation component within the first filtered signal, the second intermodulation component located on a second side, opposite of the first side, of the frequency spectrum;

determining, by the intermodulation filter, an estimated second intermodulation component based on the potential frequency band location;

determining, by the intermodulation filter, a correction factor based on an amplitude and phase relationship between the first intermodulation component and the second intermodulation component;

applying, by the intermodulation filter, the correction factor to the estimated second intermodulation component to generate an adjusted estimated second intermodulation component; and applying, by the intermodulation filter, in response to the second intermodulation component exceeding a predetermined power threshold, the adjusted estimated second intermodulation component to the first filtered signal to suppress the second intermodulation component of the first filtered signal.

8. The method of claim 7, wherein applying the adjusted estimated second intermodulation component to the first filtered signal suppresses the second intermodulation component of the first filtered signal by approximately 16 dB.

* * * * *